United States Patent [19]

Min et al.

[11] Patent Number: 4,685,009
[45] Date of Patent: Aug. 4, 1987

[54] CASSETTE LOADING APPARATUS FOR VIDEO CASSETTE RECORDER

[75] Inventors: Seong K. Min; Yong J. Kim; Hee W. Lee; Chul G. Chun, all of Suwon, Rep. of Korea

[73] Assignee: Samsung Electronics Co., Ltd., Kyungki-do, Rep. of Korea

[21] Appl. No.: 703,615

[22] Filed: Feb. 21, 1985

[30] Foreign Application Priority Data

Feb. 27, 1984 [KR] Rep. of Korea ............... 84-1584
Feb. 27, 1984 [KR] Rep. of Korea ............... 84-1586
Feb. 27, 1984 [KR] Rep. of Korea ............... 84-1587
Mar. 20, 1984 [KR] Rep. of Korea ............... 84-1437

[51] Int. Cl.⁴ ............................................ G11B 15/66
[52] U.S. Cl. ................................. 360/95; 360/96.5
[58] Field of Search ..................... 360/93, 95, 96.5

[56] References Cited

U.S. PATENT DOCUMENTS 4,408,236 10/1983 Murata et al. ............... 360/95
4,410,919 10/1983 Umeda ........................... 360/95

FOREIGN PATENT DOCUMENTS 55-87339   7/1980  Japan ............................. 360/95
58-188354 11/1983  Japan ............................. 360/95
59-154665  9/1984  Japan ............................. 360/95
2125608    3/1984  United Kingdom ............ 360/95

Primary Examiner—John H. Wolff
Assistant Examiner—Matthew J. Bussan
Attorney, Agent, or Firm—Oblon, Fisher, Spivak, McClelland & Maier

[57] ABSTRACT

A motor installed on a wall of a cassette housing operates a placement gear and a rotating member for safely placing a cassette holder on a deck and then also operates a ring gear, which is installed on the deck, in order to load video tape for reproduction, thereby making it possible that both the action of placing the cassette holder on the deck and the action of loading the tape for reproduction can be achieved by using only one motor. A combination of a sector gear and a cam or a disc with a built-in spring can also be used in order to lock the cassette holder properly after the cassette holder, with the cassette held therein, is placed on the deck.

5 Claims, 16 Drawing Figures

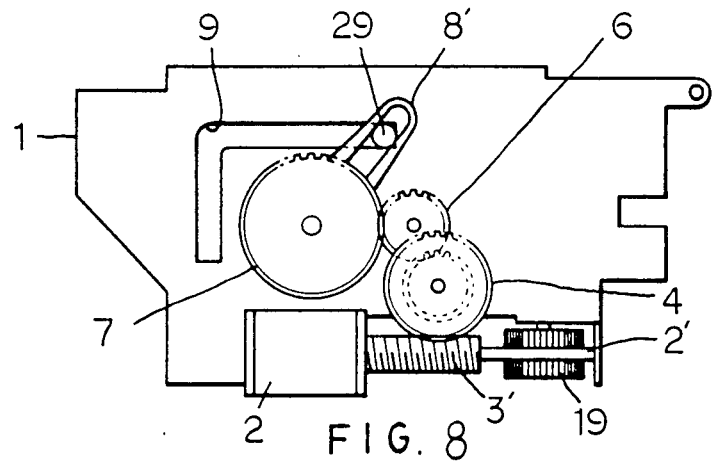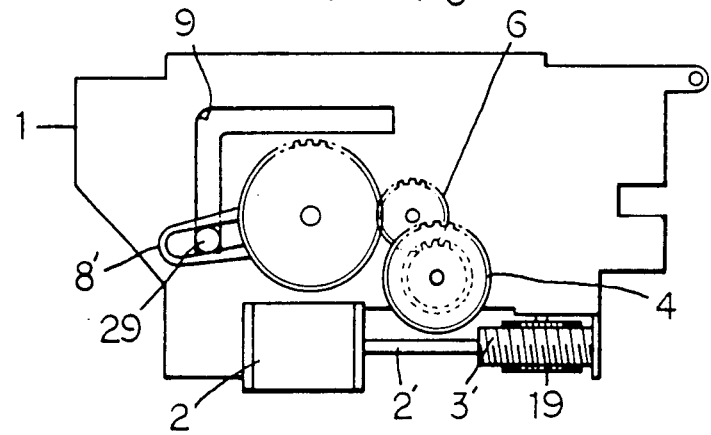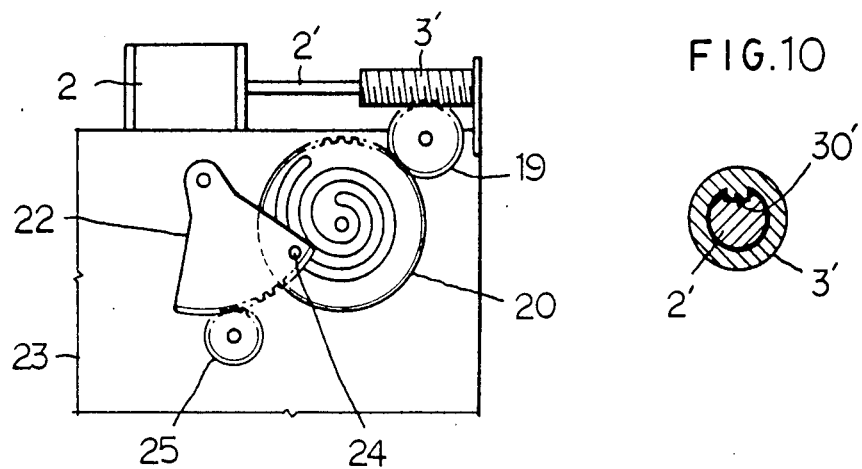

CASSETTE LOADING APPARATUS FOR VIDEO CASSETTE RECORDER

BACKGROUND OF THE INVENTION

1. Field of the Invention

The present invention relates to a cassette loading apparatus for a video cassette recorder having a front loading system, more particularly to an apparatus for placing the video cassette holder having the cassette in it on the deck and pulling out the video tape from the cassette to be loaded on the upper drum of the video cassette recorder (hereinafter called the VCR).

2. Discussion of the Background

A VCR having a conventional front loading system is usually equipped with a device designed to safely place on the deck the cassette holder holding the video cassette in it and a device designed to pull out the video tape from the said cassette for loading, wherein the two devices are operated by two different motors.

As the cassette holder placing and tape loading as discussed above must be made within a certain interval of time but without interruption, the construction of the loading system ordinarily requires two motors, two different sets of transmission gears, a limit switch, etc., thereby contributing to increased production cost and constituting an obstacle to miniaturization of the VCR itself.

·Further, the tape loading and reproducing operations of the VCR can be normally accomplished only when the cassette holder, placed safely on the deck, is properly locked so as not to shake or sway. However, the conventional VCR has the defect that the cassette holder placed on the deck is apt to be excessively pressed under the influence of the motor's inertia and as a result, the parts of the VCR are deformed or damaged.

SUMMARY OF THE INVENTION

The present invention is intended to obviate these and other problems of the conventional system.

Accordingly, it is a particular object of the present invention to provide a new front loading system for a VCR in which safe cassette holder placing and tape loading are achieved by using only one motor.

Another object of the present invention is to make it possible to manufacture a smaller size of VCR by providing a video cassette loading system of reduced size.

Still another object of the present invention is to provide a system in which the cassette holder, placed safely on the deck, is properly locked so as not to deform or damage the other parts of the VCR.

These and other objects of the present invention will become readily apparent from the detailed description of the preferred embodiments of the present invention.

In the preferred embodiment of the present invention, a motor installed on a wall of the cassette housing operates a placement gear and a rotating member for safely placing the cassette holder on the deck, and then the video tape is loaded on the upper drum for reproduction according to the movement of two loading poles resulting from rotating a ring gear which is operated by a sector gear interlocked with a master cam that is installed at the bottom of the deck, thereby making it possible that both actions to place the cassette holder safely on the deck and to load the tape for reproduction can be achieved consecutively by using only one motor, wherein the cassette holder may not be pressed excessively after being placed on the deck because the rotating member which locks the interlocking pin of the cassette holder comes to a standstill even though the said placement gear rotates further under the influence of the motor's inertia. A combination of a sector gear and a cam or a disc with a built-in spring can also be used in order to lock the cassette holder properly after the cassette holder, holding the cassette in it, is placed on the deck.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7 and 8 are operational side elevations of the embodiment of FIG. 6;

FIG. 9 is a operational bottom view of the embodiment of FIG. 6;

FIG. 10 is an enlarged sectional view of the combination of the worm and the motor's rotating shaft used in the embodiment of FIG. 6;

DETAILED DESCRIPTION OF THE PREFERRED EMBODIMENT

Figure 16:
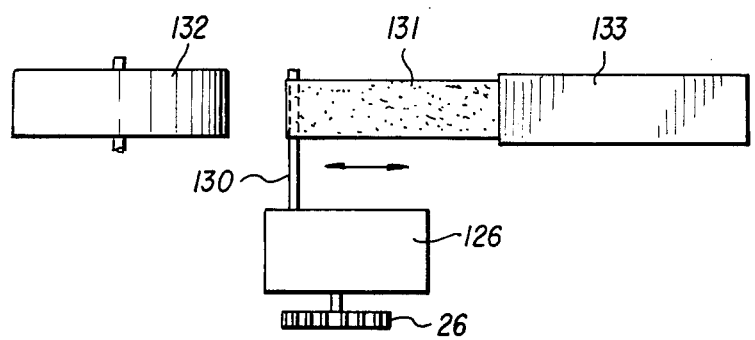
FIG. 16 is a side elevation schematically illustrating conventional structure operated by a ring gear.

Referring now to the drawings, wherein like reference numerals designate identical or corresponding parts throughout the several views, and more particularly to FIGS. 1-5 thereof, there are shown a conventional cassette holder housing 1, a motor 2 having a worm 3 on its rotating shaft and installed on a side wall of the housing 1, a worm gear 4 made in a body with a flat gear 5, an intermediate gear 6 engaged with the said flat gear 5, a right-angled opening 9, a placement gear 7 having a concentric circular opening 16 having a concavity 17, a rotating member 8 with an extended arm lever 8', a broad opening 14 and a projected hanger 15, and a movable pin 13 which slides a guide opening having an arc-shaped portion 11 and an escape groove 12 and which also slides through the broad opening 14 of the rotating member 8. Elements 7, 8 and 13 are axially fixed on an axis 10 on the housing's wall, wherein a torsion spring 18, fixed between the movable pin 13 and the projected hanger 15, operatively combines the placement gear 7, the rotating member 8 and the movable pin 13. The placement gear 7 engages with the intermediate gear 6. There are further shown a connecting gear 19 installed at the bottom of the deck 23 and engaging with the worm 3, a master cam 20 formed with a cam groove 21, a sector gear 22 with a driving pin 24 engaging with the cam groove 21, interlocking gears 25, 25', 25" and a ring gear 26. As shown schematically in FIG. 16, the ring gear 26 may operate a conventional mechanism 126 which moves two loading poles 130 in order to load the video tape 131 on the upper drum 132 for reproduction after pulling out the tape from the cassette 133. FIG. 16 illustrates an intermediate stage of the operation.

Figure 1:
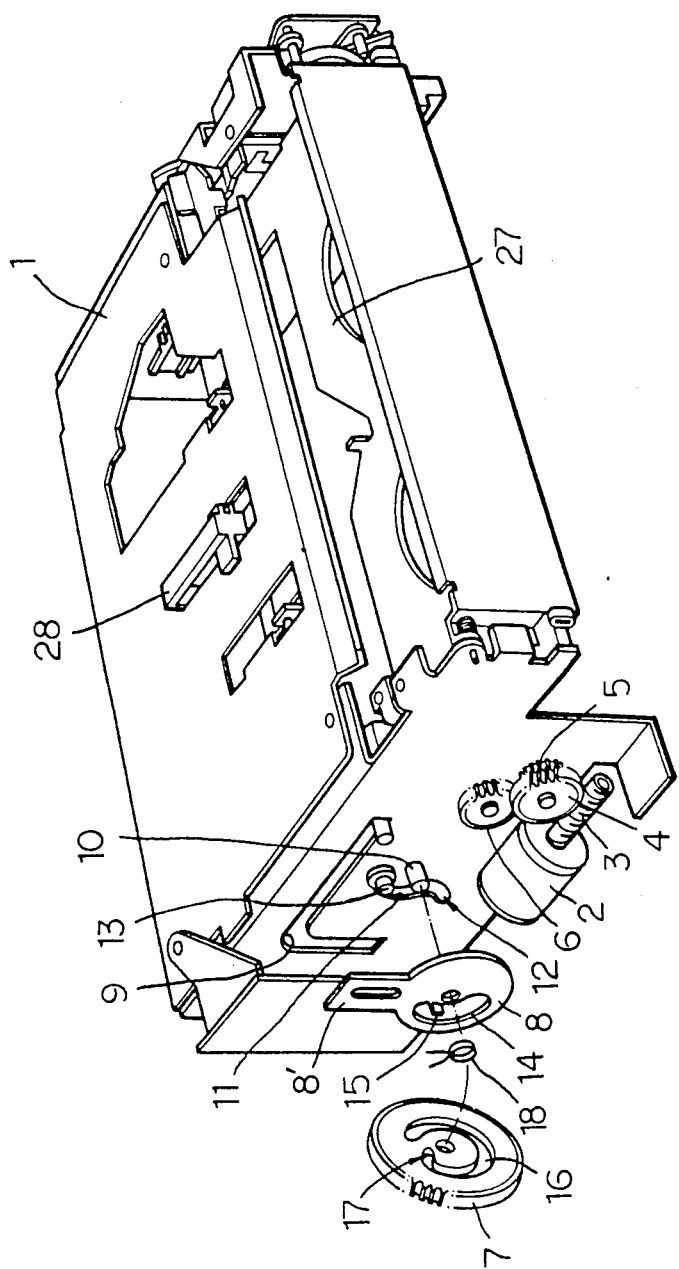
FIG. 1 is a partially exploded perspective illustration of a preferred embodiment according to the present invention.
Figure 2:
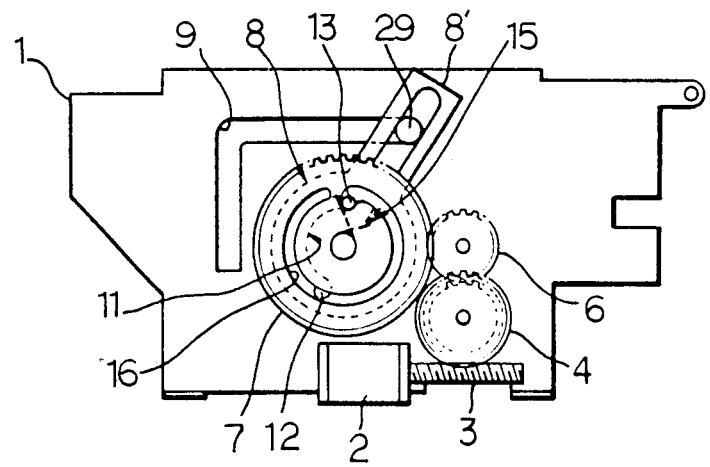
FIG. 2 is a side elevation of the embodiment of FIG. 1.
Figure 3:
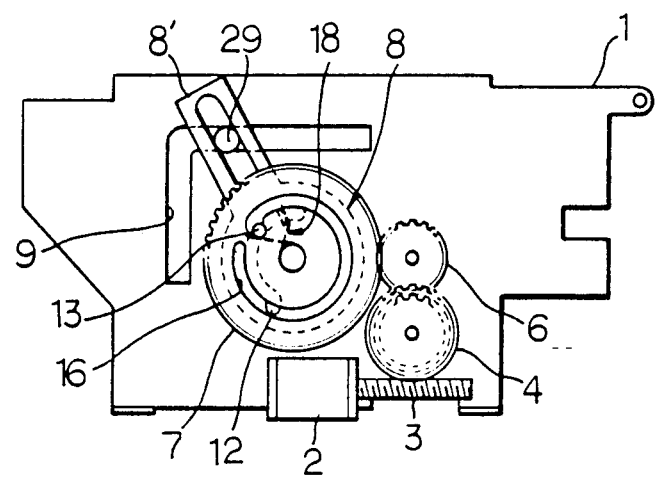
FIGS. 3 and 4 are operational side elevations of the embodiment of FIG. 1.
Figure 4:
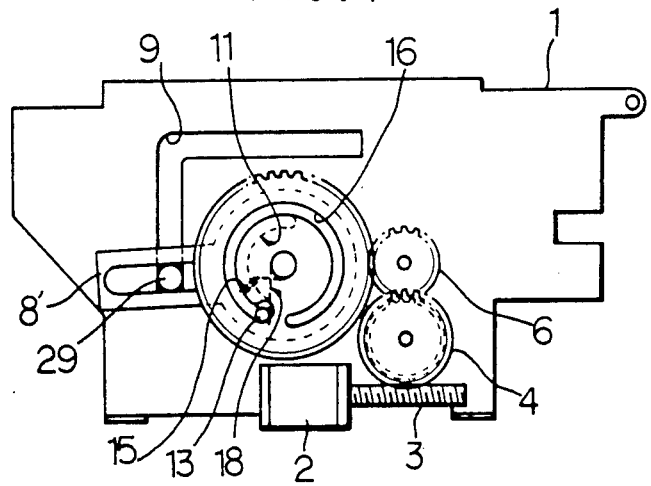
Figure 5:
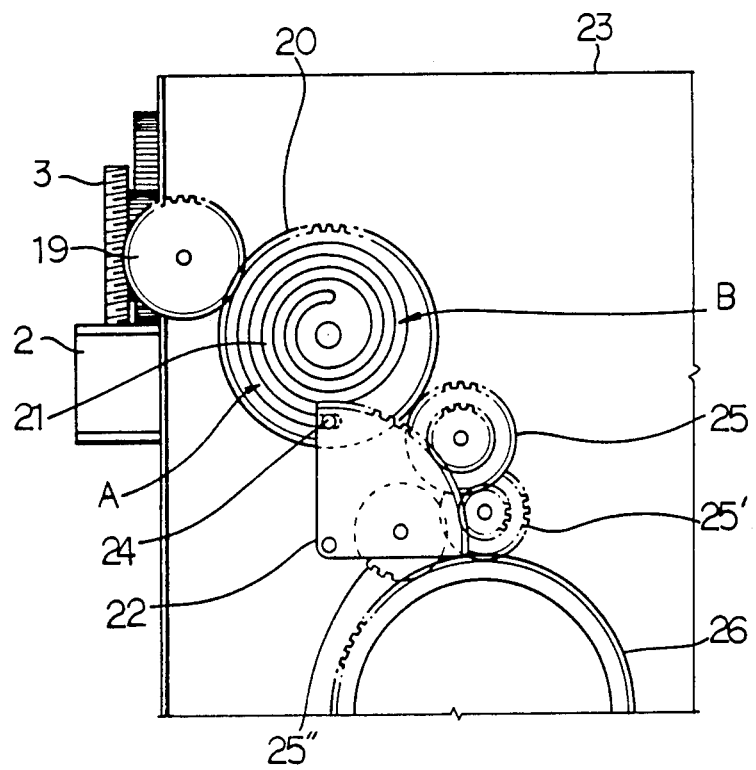
FIG. 5 is a bottom view of the embodiment of FIG. 1.
Figure 6:
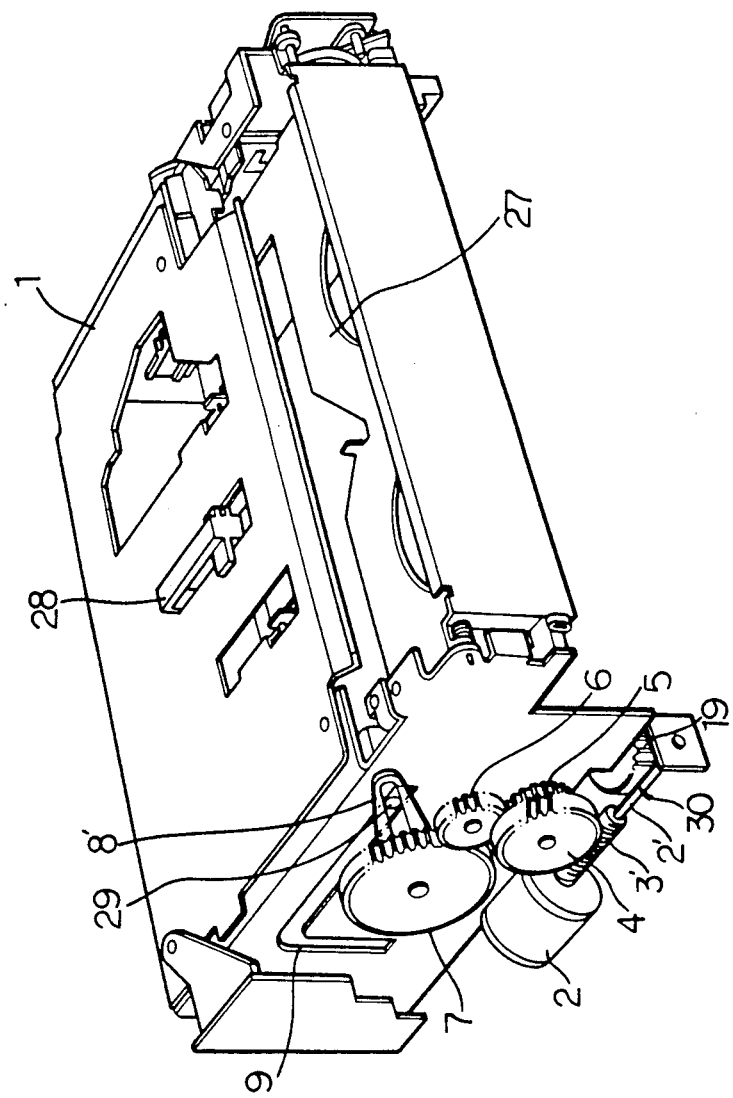
FIG. 6 is a perspective illustration of a second embodiment according to the present invention.

With reference now to FIGS. 2 to 4, when the cassette is inserted from the front of the housing 1 so as to be held in the cassette holder 27, a cassette switch 28 fixed on the top of the housing 1 operates and connects an electric source to the motor 2. The motor 2 then operates, making the worm 3 revolve the worm gear 4 and the connecting gear 19 simultaneously. The rotating power of the worm gear 4, in turn, revolves the placement gear 7, installed axially on the axis 10, through operation of the flat gear 5 and the intermediate gear 6.

Thus, the movable pin 13, caught in the concavity 17 at an end of the circular opening 16, slides along the arc-shaped portion 11 of the guide opening by the rotation of the placement gear 7, thereby revolving the rotating member 8, which is elastically installed by the torsion spring 18 fixed on the movable pin 13 and the hanging piece 15. The rotation of rotating member 8 causes rotation of its arm lever 8'.

Further, the interlocking pin 29, formed on the side wall of the cassette holder 27 and inserted through the opening 9, moves horizontally and then vertically along the opening 9, thereby causing the cassette held in the cassette holder 27 to be placed safely on the deck 23.

Though the motor 2 continues to operate even after the cassette holder is safely placed on the deck, the rotating member 8 stops rotating and only the placement gear 7 keeps rotating. The cassette holder 27 is locked properly, because the movable pin 13 escapes from the arc-shaped portion 11 of the guide opening and moves to and stays in the escape groove 12. Therefore, the rotation of the placement gear 7 is not further transmitted to the rotating member 8. In other words, as the placement gear 7 alone keeps revolving, the cassette holder placed on the deck is not pressed excessively by the arm lever 8' of the rotating member 8.

Until the cassette holder 27 is safely placed on the deck 23 through the operation described above, the sector gear 22 remains idle, because the driving pin 24 of the sector gear 22 idles through the cam groove's outer part A, which forms a concentric circle with the master cam 20, while the master cam 20 is rotated by the connecting gear 19 interlocked with the worm 3.

At the moment when the cassette holder is placed on the deck, the driving pin 24, which was moving along the outer concentric part A of the cam groove 21 of the master cam 20, reaches the operating part B of the cam groove 21. Thus, from the moment the placement gear 7 begins to idle, the driving pin 24 slides through the operating part B of the cam groove 21, and the sector gear 22 starts to operate, making the gears 25, 25', 25" rotate. Further, the ring gear 26 are rotated and two loading poles is moved to pull out the tape from the cassette which is held in the cassette holder and load it on the upper drum of the VCR.

On the other hand, if the aforesaid operation (i.e., safely placing the cassette holder on the deck and effecting the tape loading) is conducted in reverse order through operation of the motor 2 in reverse, by pushing or touching the eject switch of the VCR, the tape is unloaded and then the cassette is ejected from the cassette holder by the interlocking pin 29 and the arm lever 8' of the rotating member 8.

FIGS. 6-10 show a second embodiment which is modification of the above-described embodiment according to the present invention, wherein a placement gear 7 and an arm lever 8' are made to revolve simultaneously by the rotating power of the motor 2 transmitted by the movable worm 3', the worm gear 4 with the flat gear 5 and the intermediate gear 6. The rotating shaft 2' of the motor 2 has a guide groove 30 extending therealong so that the movable worm 3', the projection 30' (FIG. 10) of which engages with the guide groove 30, may slide on it forward and backward. The connecting gear 19, the master cam 20 with its cam groove 21 and an interlocking gear 25 are installed in engagement with each other at the bottom of the deck 23 so that the movable worm 3' may transmit the rotation power of the motor 2 to them.

When the motor 2 operates, the movable worm 3', which engages with the worm gear 4, rotates by the rotation of the rotation shaft 2', as shown in FIGS. 7 and 8, and transmits the motor's rotation power to the placement gear 7 through the worm gear 4, flat gear 5 and the intermediate gear 6, thereby rotating the placement gear 7 and its arm lever 8' simultaneously. The interlocking pin 29, formed on the side wall of the cassette holder 27 and inserted into the guide hole of the arm lever 8', moves horizontally and then vertically along the right-angled opening 9 so that the cassette holder 27 may be safely placed on the deck. As the movable worm 3' is engaged only with the worm gear 4 and is separated from the connecting gear 19 during such placing operation, the tape loading device at the bottom of the deck 23 does not operate.

After the cassette holder 27 is safely placed on the deck by the above-said operation, the motor 2 continues to operate. However, the placement gear 7 stops rotating when the interlocking pin 29 guided by the arm lever 8' reaches the end of the opening 9 and the arm lever 8' also stops moving forward. As the arm lever comes to a standstill, the placement gear 7 cannot rotate anymore and the intermediate gear 6 and the worm gear 4 are also in the same condition, the cassette holder 27 having been properly locked by the interlocking pin 29 and the lever 8'. Because the worm gear 4 cannot rotate and the motor 2 keeps running, the movable worm 3' is forced to slide toward the opposite part of the rotating shaft 2' and engages with the connecting gear 19, making the connecting gear 19 start to rotate. Thereafter, the motor 2, the worm 3', the connecting gear 19, the master cam 20, the interlocking gear 25 and the ring gear (not shown) operate in the same manner as described above with reference to FIG. 5.

Thus, with the rotation of the ring gear, the loading poles start to move so as to effect the tape loading on the upper drum.

The previous explanation on the operation of ejecting the cassette, of course, applies to the present modification, and the cassette is easily ejected from the cassette holder.

Figure 11:
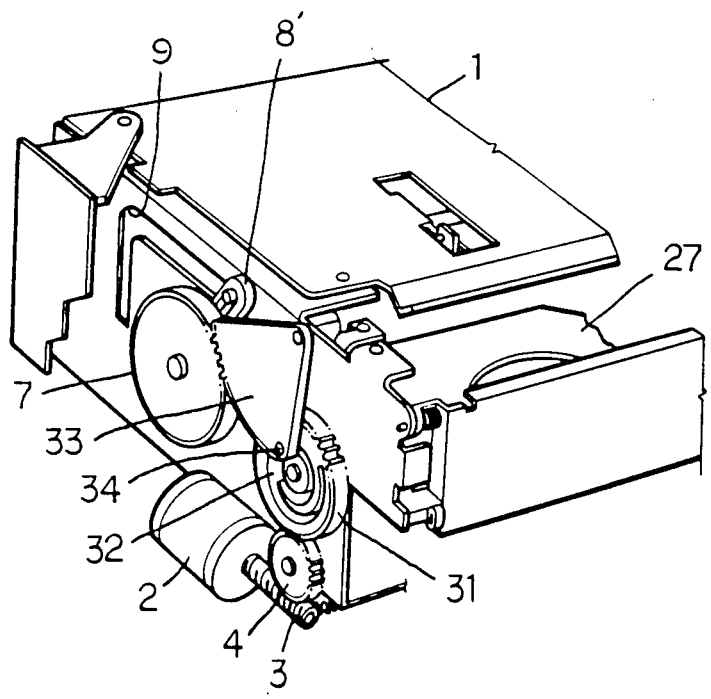
FIG. 11 is a perspective illustration of a third embodiment according to the present invention.
Figure 14:
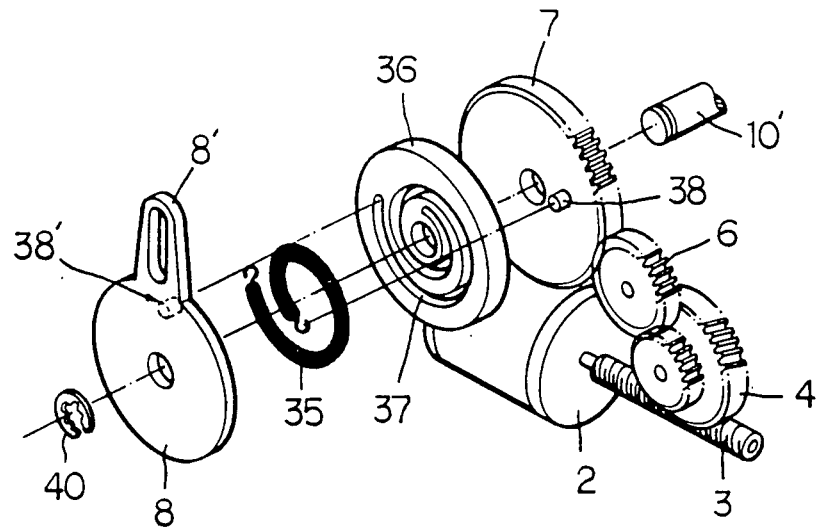
FIG. 14 is a partially exploded perspective illustration of a fourth embodiment according to the present invention.

Though the cassette holder can be properly locked by the combination of the arm lever 8' and the gears so as not to shake or sway in the above two embodiments, there can be other modifications providing the same performance within the scope of the present invention. FIGS. 11 and 14 respectively show two examples of such modification in the form of third and fourth embodiments.

Figure 12:
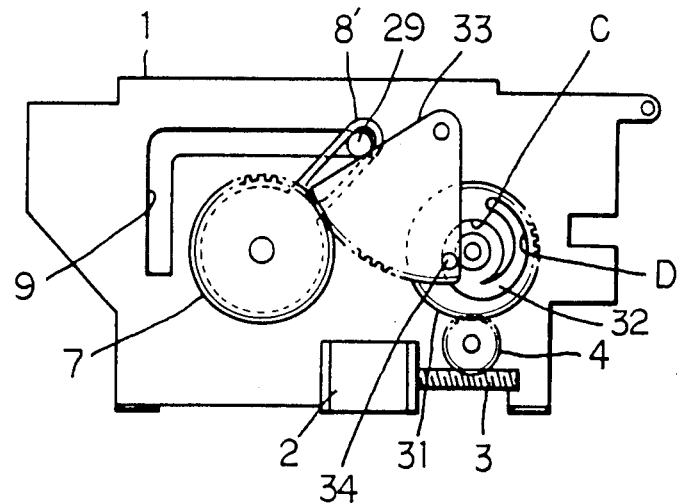
FIGS. 12 and 13 are operational side elevations of the embodiment of FIG. 11.
Figure 13:
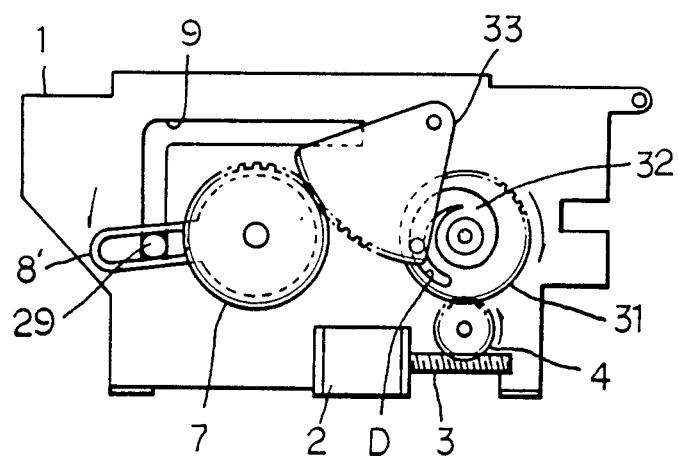

In FIGS. 11 to 13, a cam gear 31 is driven by the worm 3 and engages the sector gear 33 by means of cam groove 32 and driving pin 34.

When the motor 2 operates, the worm 3 rotates the worm gear 4, making the cam gear 31 rotate as shown in FIG. 13. As the cam gear 31 starts to rotate, the driving pin 34 of the sector gear 33 also starts to slide in the operation part C of the cam groove 32, making the sector gear 33, the placement gear 7 and the arm lever 8' start to operate, as shown in FIGS. 12 and 13. Then, as the arm lever 8' forces movement of the interlocking pin 29, formed on the side wall of the cassette holder 27, horizontally and then vertically along the right-angled opening 9, the cassette holder 27 holding the cassette in it is safely placed on the deck when the driving pin 34 arrives at the end of the operation part C of the cam groove 32. Because the motor 2 is designed to operate a little more after the cassette is placed on the deck, the driving pin 34 slides a little further into the concentric area D of the cam groove 32 and the cassette holder is tightly locked by means of the interlocking pin 29, the arm lever 8' and the cam mechanism. Even if the cam gear 31 rotates a little further by inertia or else after the motor 2 stops rotating, the cassette holder 27 is not pressed excessively because the driving pin 34 slides in the concentric area D of the cam groove 32 and thus the sector gear 33 does not move further.

Figure 15:
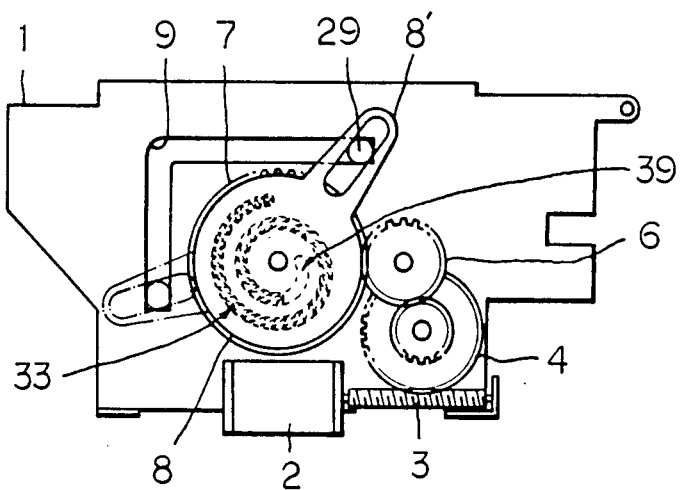
FIG. 15 is an operational side elevation of the embodiment of FIG. 14.

In FIGS. 14 and 15, showing a fourth embodiment and another example of a modification, a placement gear 7, a disc 36 with a spiral opening 37 in which a tension spring 35 is kept and a rotating member 8 with an arm lever 8' are assembled in a body by means of a fixing ring 40 onto the axis 10' formed on a wall of the cassette holder housing 1 to perform the cassette holder placing function. Two opposite ends of the tension spring 35 are respectively tied on a fixing pin 38 protruding from a wall of the placement gear 7 and another fixing pin 38' formed on the inner wall of the rotating member 8, leaving a space 39 at the inner end of the spiral opening 37. The placement gear 7 is rotated by means of the intermediate gear 6, the worm gear 4 and the worm 3.

Accordingly, when the motor 2 operates and the placement gear 7 is forced to rotate by means of the worm 3, the worm gear 4 and the intermediate gear 6, the tension spring 35, an end of which is caught by the fixing pin 38 on the wall of the placement gear 7, pulls the rotating member 8 by the fixing pin 38' on which another end of the spring 35 is fixed, and thereby the rotating member 8 is forced to rotate.

Therefore, when the placement gear 7 rotates, the fixing pin 38' of the rotating member 8 is pulled by the tension spring 35, and the rotating member 8 is forced to rotate together with its arm lever 8', which motion makes the interlocking pin 29, formed on the cassette holder, slide vertically and then horizontally along the right-angled opening 9 in order to place the cassette holder on the said deck in the same manner as described in the above.

When the cassette holder is safely placed on the deck and the interlocking pin 29 reaches as far as the end of the opening 9, the arm lever 8' cannot slide further and the interlocking pin 29 is locked by the combination of the arm lever 8' of the rotating member 8 and the gears 4, 6 and 7. However, as the motor 2 operates a little further, as designed, the fixing pin 38 of the placement gear 7 pulls an end of the tension spring 35 toward the space 39 formed at the inner end of the spiral opening 37, and thereby the tension spring 35 is strained and extended. As a result, the tension spring 35 pulls elastically the arm lever 8' of the rotating member 8 by the fixing pin 38' on the inner wall of the rotating member 8 to a certain extent such that the tension spring 35 is extended, thereby assisting the locking of the interlocking pin 29 so that the interlocking pin 29 is pressed firmly and flexibly. Therefore, the tension spring 35, tightened as such, absorbs impacts effected from outside and protects the cassette holder from being excessively pressed by the arm lever 8' or being shaken by the foreign impacts.

Although the present invention has been described with respect to the preferred embodiments constructed in accordance therewith for the purpose of illustrating the manner in which the invention may be used to advantage, it will be apparent to those skilled in the art that various variations, modifications, equivalent arrangements or improvements may be made without departing from the scope and spirit of the invention. Accordingly, it will be appreciated that the invention is not to be limited by the specific embodiments herein, but only by the scope of the appended claims.

What is claimed is:

1. A cassette loading apparatus for placing a cassette holder having a magnetic tape held therein onto a deck and for driving a ring gear to operate means for pulling tape from the cassette and for loading the tape onto an upper drum for reproduction, said apparatus comprising:
   a housing having formed therein a right-angled opening;
   an interlocking pin fixed on said cassette holder and extending through said right-angled opening;
   an axis on said housing;
   an arm lever mounted for rotation about said axis and drivingly engaging said interlocking pin;
   a placement gear mounted for rotation on said axis;
   means drivingly coupling said placement gear to said arm lever, wherein rotation of said placement gear causes motion of said interlocking pin in said right-angled opening;
   a motor mounted on said housing;
   a worm mounted on a shaft of said motor;
   gearing means for drivingly coupling said worm to said placement gear;
   a master cam mounted on the bottom of said deck, said master cam having a cam groove formed therein;
   a driving pin received in said cam groove of said master cam;
   gear means drivingly coupling said driving pin received in said groove of said master cam to said ring gear; and
   connecting gear means for drivingly coupling said worm to said master cam, wherein operation of said motor causes motion of said arm lever to move said interlocking pin to place said cassette holder on said deck and further drives said master cam to rotate said ring gear, whereby said tape is pulled from said cassette and loaded onto said upper drum for reproduction after said cassette holder is placed on said deck.

2. Apparatus as claimed in claim 1, wherein:

a guide opening having an arc-shaped portion and an escape groove at an end thereof are formed in said housing;

a movable pin is mounted for movement in and along said guide opening;

said placement gear has a concentric circular opening formed therein, said concentric circular opening terminating in a concavity at an end thereof, said movable pin being received in said concentric opening;

a rotating member is mounted for rotation on said axis, said arm lever extending from said rotating member, said rotating member having a broad opening formed therein, said movable pin being received in said broad opening, there being a projected hanger extending from a face of said rotating member; and a torsion spring having first and second ends is disposed such that the first end thereof is in engagement with said projected hanger and the second end thereof engages said movable pin.

3. Apparatus according to claim 1, wherein:

said worm is mounted for movement along said shaft of said motor between first and second positions, said worm being fixed against relative rotation with respect to said shaft;

said gearing means for drivingly coupling said worm to said placement gear are disposed for engagement with said worm when said worm is in said first position; and said connecting gear means for drivingly coupling said worm to said master cam are disposed for engagement with said worm when said worm is in said second position.

4. Apparatus as claimed in claim 1, wherein said gearing means for drivingly coupling said worm to said placement gear comprise a sector gear and a cam gear, said sector gear drivingly engaging said placement gear, said cam gear having a cam groove formed therein, there being a driving pin fixed on said sector gear and disposed in said cam groove, an outer end of said cam groove being formed as a part of a circle concentric about an axis of rotation of said cam gear.

5. Apparatus as claimed in claim 1, wherein:

a fixing pin extends from a face of said placement gear;

a rotating member is disposed for rotation on said axis, said arm lever extending from said rotating member, there being a fixing pin extending from a face of said rotating member;

a disk is mounted for rotation on said axis, said disk having a spiral opening formed therein; and a tension spring is disposed in said spiral opening of said disk, opposite ends of said tension spring being respectively fixed on said fixing pins, there being a space at the inner end of said spiral opening not occupied by said tension spring.

* * * * *